S. Males,

Urinal.

No. 3939. Reissued Apr. 26. 1870.

Witnesses;
Oscar Hoadley
Frank McElwaid

Inventor;
S. Males
Per Pugh & Pugh
Attys

N. PETERS, PHOTO-LITHOGRAPHER, WASHINGTON, D. C.

United States Patent Office.

SAMUEL MALES, OF CINCINNATI, OHIO.

*Letters Patent No.* 73,907, *dated January* 28, 1868; *reissue No.* 3,939, *dated April* 26, 1870.

IMPROVEMENT IN URINALS.

The Schedule referred to in these Letters Patent and making part of the same.

*To all whom it may concern:*

Be it known that I, SAMUEL MALES, of Cincinnati, Hamilton county, State of Ohio, have invented a new and useful Improvement in Public Urinals; and I hereby declare that the following is a full, clear, and exact description thereof, reference being had to the accompanying drawings making part of this specification.

The object of this invention is to provide one of the greatest wants of the city public at the present time, viz, an inclosed public urinal or necessary, specially adapted for contracted alleys, &c., which, when open and in use, will sufficiently screen the occupant from public view, and be of such construction that it will close automatically when not in use, in such a way as to project but little from the wall, and afford no lurking-place for evil-disposed persons, or convenience for the commission of any nuisance.

In the accompanying drawings—

A is a house or other wall.

B, a frame erected thereto.

C is a plate let into and attached to the wall, having receptacle D′ and pipe E to catch and conduct the urine to the catch-basin or sewer.

F F′ are outward bayed or curved door or doors, hinged at *f*, having a spring, G, tending to keep them closed.

Figure 1:
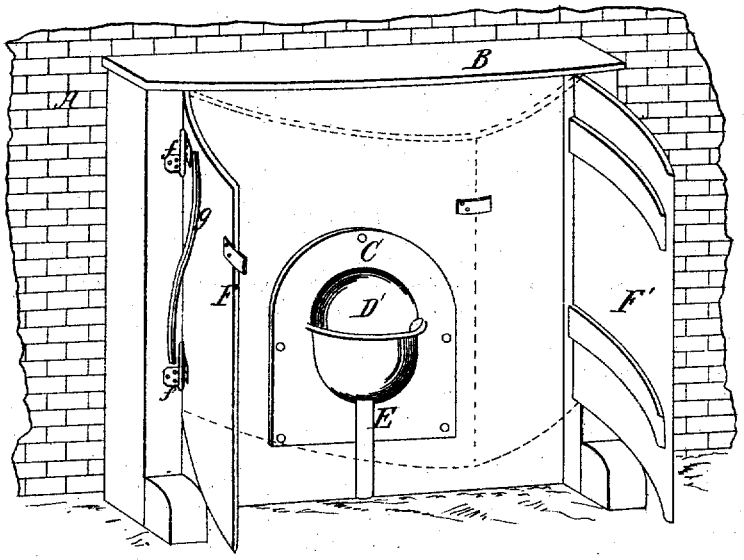
Figure 1 is a perspective view of a public urinal of my invention.

The door F has a catch, H, which engages over the edge of the door F′ when the necessary is occupied, as seen in the dotted red lines, fig. 1.

Figure 3:
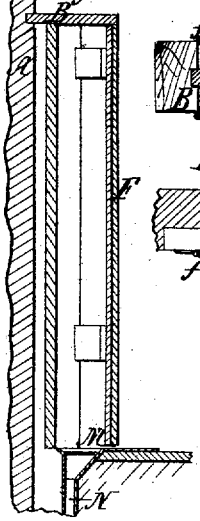
Figure 3 shows a modification, for the use of females.

In the modification intended for females (see fig. 3) the doors will nearly reach the ground, while in those intended for men (see figs. 1, 2, 4, and 6,) the door will not reach within twelve or fourteen inches of the ground, so that a commission of any nuisance upon the ground will be impossible without an exposure of the person, and no one can lurk inside for any criminal purposes without being seen.

It will be seen that the doors are folded past each other when the necessary is unoccupied, and, in this case, that there is not room for any evil-disposed person to conceal himself behind them, as they approach so near the back part of the urinal, thus obviating one great objection to the introduction of public necessaries in cities, namely, the forming of a lurking-place for thieves.

Figure 6:
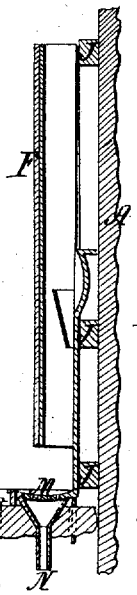
Figure 6 is a vertical section showing a further modification.
Figure 2:
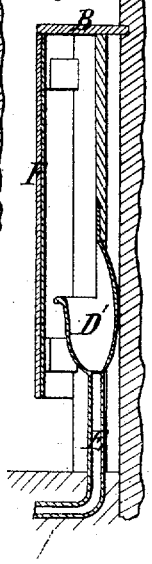
Figure 2 is a vertical section of the same.
Figure 5:
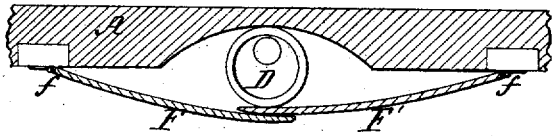
Figure 5 is a modification in horizontal section, in which the doors are hinged to the wall of the house.
Figure 9:
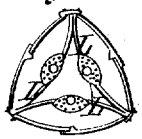
Figures 8 and 9 show modifications of my curved partitions.
Figure 8:
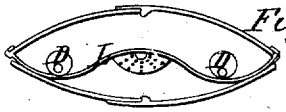
Figure 7:
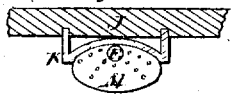
Figure 7 is a horizontal section through a guard or shield.

My necessary has a seat, *d*, formed of a large open pipe with sloping top, so that no one can stand upon the same, but must use it in a proper manner The main claim as to utility made, next to the avoidance of the objectionable features of such structures heretofore, namely, as hiding-places for any evil-disposed persons, and as places particularly subject to the commission of nuisances, is that so very little room is taken up.

Where permissible, economy of space (in the case of privies) may be secured, as in fig. 5, by making a slight recess, A *a*, of eight to twelve inches, at its greatest depth, into the wall, so that the projection of the doors need not exceed six inches from the general surface of the wall, thereby providing a much-needed water-closet for alleys. In this case the hinge is affixed to an iron block, I, let into the wall for that purpose.

Where an attachment to the wall or house would be objectionable, I provide a separate frame, complete in itself, as seen in fig. 6, in which J is the supporting-frame and K a plate, forming a guard or shield, shown by horizontal section in fig. 7, having a conducting-pipe, E, leading from the pot D, and formed with such concavity as to conduct to the sink M the misdirected urine of inebriate and careless persons.

Where a frame is used, as here shown, the curve of the door may be less. The object of the curve or baying of the door is made to protect and inclose the urinal, so that, when closed, it will occupy but little space upon the wall of street or alley, and inclose the urinal in such a manner that pressure on the doors will be expended on the wall or frame to which they are attached. Two doors are preferable, as they can be opened in the center and stayed one against the other, affording thereby a greater amount of room when occupied.

Figure 4:
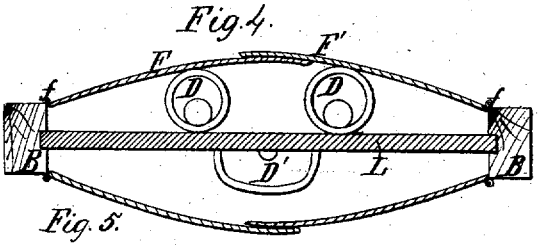
Figure 4 is a horizontal section of a form for an open space, such as a market, public landing, &c.

Fig. 4 shows a modification for open spaces. It takes double form, and the "seats" can be so arranged in respect to each other that, by adopting a curve for the partition L between the two sides, (thereby forming a recess for each seat,) the width of the house, in its closed or unoccupied condition, need not exceed twenty inches.

I do not confine myself to the use of the two doors F F′, as it is evident that one door or more than two may be used to accomplish the main purpose. My urinal is applicable to workshops or stores, as well as to public use. One obvious advantage of my arrangement is, that the position of the doors indicates to outsiders whether the urinal be occupied or not, and the space inclosed by the doors F F′, when fastened in condition for use, is most roomy in front of the basin, affording an additional guarantee against misuse of the necessary or urinal. Although springs are here described for closing the doors, it is obvious that weights or gravitating hinges may be used for this purpose.

I claim herein as new and of my invention—

1. A public urinal or necessary, having the curved or bayed door or doors F or F′, adapted when open to screen the occupant from public view, and when not in use to close automatically, by spring or gravitating hinges, to a position in which the door or doors will snugly inclose the urinal-bowl, in the manner and for the purpose specified.

2. The combination and arrangement of the door or doors F or F′, shield K, pot D′, sink M, and pipe E, substantially as and for the purpose set forth.

3. The formation of a water-closet by means of a recess in the wall, A *a*, fig. 5, sloping seat D, and doors F F′, substantially as and for the purpose set forth.

4. In connection with a public urinal or privy, constructed substantially as described, the provision of the frame J, as and for the purpose specified.

In testimony of which invention I hereunto set my hand.

SAMUEL MALES.

Witnesses:

FRANK MILLWARD.
J. L. WARTMANN.